United States Patent Office 3,060,082
Patented Oct. 23, 1962

3,060,082
TREATMENT OF PLANTS EMPLOYING TANNIN MATERIALS
Joseph Kokurewicz, S. Paarl, Cape Province, Union of South Africa
No Drawing. Filed Sept. 8, 1959, Ser. No. 838,392
Claims priority, application Union of South Africa Sept. 18, 1958
6 Claims. (Cl. 167—24)

This invention relates to a method and compositions for treating harmful diseases, and in particular, it is directed to the treatment of diseases associated with the grape-producing and stone-fruit-producing arts.

The inspiration behind this invention was derived from a consideration of a serious problem in the grape-producing industry—controlling the disease *Botrytis cinerea* of vines.

The most recent means for control which have been introduced into practice 4–6 years ago are, among others:

(1) Tetramethylthiuram disulphide (thiram)
(2) Ferric dimethyldithiocarbamate (ferbam)
(3) Zinc dimethyldithiocarbamate (ziram)
(4) Manganese dimethyldithiocarbamate (manam)
(5) Zinc ethylene bisdithiocarbamate (zineb)
(6) Manganese ethylene bisdithiocarbamate (maneb)
(7) 2:2-dihydroxy-5:5-dichlorodiphenylmethane
(8) N - trichloromethylthiotetrahydrophthalimide (captan)

the last being the most important and most widely used compound. (In Germany, Phytox, Fungo-pulvit, F 40, Fuclasin, Pomarsol, Polyram, Lutiram, Dithane and Orthocid.)

According to the English research worker, E. L. Frick (Laboratory Tests of the Effects of Fungicides on the Spore Germination of *Botrytis cinerea*, Q 85, Annual Report of the East Malling Research Station for 1954), all of these preparations in concentrations of 0.0001% to 0.01% destroy all of the conidia of the gray mold fungus, but not the remaining spores.

According to Dr. A. F. Wilhelm, Freiburg (Der Deutsche Weinbau, October 5, 1956), the group of the thiocarbamates, to which Dithane, Phytox, F 40, Fuclasin and others belong, has no appreciable effect on the grey mold fungus, whereas thiuram and particularly captan, the active material of Orthocid, have a salutary effect for the treatment of Botrytis under laboratory conditions. As a matter of fact, of all the compounds tested, only Orthocid exhibited a potent hindering effect against the growth of the fungi. In these tests, the nutrient medium consisted of 50% grape juice (50% water), combined with 0.2% dithane, or copper sulfate lime liquor (1%), soap (0.15%), and Orthocid, 0.1%, and inoculated with spores of Botrytis.

Of course, whereas the experiments in the laboratory are of interest, those conducted in the open air are of much more practical importance.

A typical experiment based on various treatments of Rulander samples in the open showed that the following results were obtained:

(1) Untreated_____ 5.35% grapes attacked (by fungi).
(2) Orthocid 0.2%_____ 1.68% grapes attacked.
(3) Orthocid 0.4%_____ 2.26% grapes attacked.
(4) Thiuram pr. 0.5%_____ 1.73% grapes attacked.
(5) Copper sulfate lime cr. 1%–0.15% soap_____ 4.66% grapes attacked.

The experiments show that Orthocid and thiuram can reduce the attack of Botrytis only to a certain extent. The reason therefore is that only the conidia, not the spores are destroyed. The latter, under actual growing conditions, are resistant to the known fungicides. It is obvious that this lack of spore-destroying activity is a highly serious disadvantage of these fungicides, and although many different fungicides have been experimentally tested, they have all failed.

It is an object of this invention, therefore, to provide an efficacious treatment for the disease *Botrytis cinerea* of vines.

It is another object of this invention to provide a treatment for destroying all harmful fungi, bacteria, and viruses associated with the grape-producing industry.

It is another object to provide a treatment of diseases associated with stone-fruit-producing industry.

It is a further object to protect plants from the so-called wound-parasites.

It is still another object to provide a process for the rapid healing of injured plants.

Other objects and advantages will become apparent on further study of the specification and appended claims.

These objects are achieved by a radically different approach to the problem of destroying the spores associated with *Botrytis cinerea* of vines. When studying the history of the grey mold fungus, we find that it is known as a so-called wound-parasite, i.e. it is able to attack only injured plants or plant parts. The infection with gray mold fungus takes place generally by means of spores which occur in every vineyard in great numbers, particularly in wet weather. For the germination of the spores, and for further growth of fungi, grape juice is unforunately an ideal nutrient medium. In the case of uninjured grapes, there is a diffusion in wet weather of a trace of cellular juice which suffices as an initial fungus nutriment, thereby rendering the grape susceptible to fungus penetration. The fungi spread from grape to grape takes place by mycelium. The readiness for infection, of course, is particularly great in grapes which are injured in any way.

Injuries to grapes are frequently caused from cracking in wet weather, when the grapes are nearly or completely ripe, susceptibility to cracking increasing as the grape becomes riper. As these cracks, so-called "hair-cracks" or fissures, form an open door for the attack of fungi, it is easily seen that the occurrence of these cracks is highly significant.

Once the grape has been penetrated by spores, the interior of the grape proves to be an excellent environment for spore growth. From these spores result conidia which may be attacked by the afore-named preparations in rather high concentrations, but, as discussed above, these preparations have no effect on the spores just formed, nor on those spores not germinated as yet, nor on spores brought by the wind, all of which are eager to commence their destructive activities on the grapes. The only means for even mediocre control is the frequent treatment with the aforesaid spraying solution which leads, however, to such an accumulation of poison on the grapes that in the manufacture of wine the fermentation step is deleteriously affected. Besides the serious problem of hindering fermentation, which incidentally has not be solved, the expenses of repeatedly spraying grape-producing areas are so high that it is economically futile.

This invention is based on the novel concept that the way to solve the problem is to make it impossible for the spores to penetrate into the inner part of the grapes. Furthermore, it has been discovered that it is possible to prevent the penetration of the spores into the grapes through cracks and injuries by the simple application of tannin. This application of tannin, surprisingly and unexpectedly, appears to heal the wounds in the grapes instantaneously. The preferred applied solution is, of course, tannin extract, instead of chemically pure tannin which is economically prohibitive.

Examples of suitable natural tannins are: Quebracho extract from heartwood of *Schinopsis lorentzii* or the related balansae. Wattle (mimosa) extract from the bark of *Acacia mollissima*. Chestnut extract from heartwood and sapwood of *Castanea sativa* and *dentata*. Myrabolan extract from the dried fruit of *Terminalia chebula* and related species. The milled bark of wattle, milled heartwood of *Schinopsis lorentzii* or related balansae or the milled heartwood and sapwood of *Castanea sativa* and *dentata* and milled dried fruit of *Terminalia chebula* and related species.

Tannin extracts can be subdivided into two groups—

(1) Hydrolyzable tannins
(2) Condensed or unhydrolyzable tannins.

Under the first group fall tannic acid (Chinese gallous tannin), chestnut extract, myrabolan, all being characterized by esters, constituted by carbohydrates (generally glucose) with several molecules of gallous acid or substances like ellagic acid, m-digallous acid, which may be considered as derivatives of gallous acid; the second group consisting of condensed, non-hydrolyzable tannins, such as quebracho-mimosa extracts, is of complicated structure, being resistant to hydrolysis and fermentation and therefore much more stable than the hydrolyzable extracts. These tannins contain, in their molecular structure, both resorcin and either catechin or pyrogallol-residues. It is important that the stability of this group facilitates its use against chemical agents and environmental influences. The activity of the enzymes phenol/phenol oxidase is proved by the different functions connected with respiration, intermediant metabolism, regulation of oxidation reduction, antibiotic effect and wound-healing effect; the latter being the most interesting effect of the tannins for the purpose of the present invention. To delve into the chemical and biological mechanism taking place in the healing of wounds would lead too far afield in this connection. Be it sufficient to observe that the preventive spraying of vines with the 1.5% mimosa extract (*Acacia mollissima*) results in an instantaneous healing of wounds and cracks in the skin of the grapes and thereby eliminating any penetration of spores into the injured grape parts. As well as the above-mentioned tannin extracts, it has also been found that derivatives of tannin are equally efficaciously used for healing fissures, the preferred derivatives being pyrogallol and catechol.

To include all tannins including also extracts and derivatives, generically, they are hereafter alluded to as tannin-type compounds.

Another feature of this invention is the application of these tannin-type compounds in mixtures with other fungicides, and insecticites, and in particular 8-hydroxyquinoline potassium sulfate. It is obvious that this mixture is highly effective, as one agent destroys conidia that are present and the other eliminates production of conidia by preventing the penetration of spores. In like manner will a tannin-type compound cooperate with other fungicides, viricides, insecticides, and bactericides to yield synergistic mixtures.

While all concentrations work to some degree, it is usually preferred to have at least a 1% by weight concentration of the tannin-type compound in the spraying solution. If 8-hydroxyquinoline potassium sulfate is used in a mixture, it is preferred to employ same in a concentration of at least 0.01%.

Another main feature of this invention is the broad concept of healing and sealing injured plant parts, particularly those parts having external fissures, and thereby protecting them from wound-parasites. Still another feature is in the discovery that the application of tannin-type compounds instantaneously heals and seals these injured plants.

Still even another feature is that tannin-type compounds can effectively treat other fungi diseases, for example *Plasmopara viticola*, anthracnose and Oïdium, as well as bacteria such as *Bacterium tumefaciens*, and also virus diseases such as "fan leaf," Yellow vein, Yellow mosaic White Emperor and Pierce virus.

With respect to the specific problem of *Botrytis cinerea*, it has been discovered that whereas former preparations could at best only reduce the attack of Botrytis to a limited extent, while not hindering germination of spores, tannin, by healing injuries and cracks, precludes any penetration of spores into the injured grape. Moreover, whereas the majority of the conventional preparations are poisonous, tannin is non-poisonous and has almost a negligible influence on the fermentation of wine. Furthermore, if it is desirable to eliminate the tannin from the grape (such as in a case where it appears that tannin might be affecting fermentation), it may be easily accomplished with a solution of gun arabic or gelatin. Of the most practical significance is that when grapes treated with tannin the crop of the next year is increased, and of course the yield of the wine is significantly increased and the quality of the wine is markedly improved.

A better appreciation and understanding of the invention can be gleaned from the following examples, which, incidentally, are nowise intended to be limitative of the appended claims.

Example I

During experiments conducted in connection with this invention, two samples of Riesling were treated with 1.5% tannin. The first sample of Riesling on a wire frame was heavily infected with Botrytis because of wet weather but, after two successive sprayings, became completely free from Botrytis. The injuries of the grapes, often of 2 mm. width due to cracking, were totally healed and, of course, there was no growth of the Botrytis. The grapes were left on the vines for a relatively long time, had thus a relatively high sugar content, whereas untreated control samples were heavily infected. In a larger scale experiment, 30 samples of Riesling were treated and the same results were obtained. The treated Riesling samples showed no damage, whereas the untreated control samples were heavily damaged.

An outstanding advantage of this invention from the quality standpoint is that the grapes of the treated vine samples contained a very high sugar content despite the unfavorably wet weather. Of equally great importance is that the grapes could be left on the vines for a long time and that the wine made from these grapes had a full and fragrant bouquet. It is believed, therefore, that with this tannin treatment, grapes can consistently reach a high degree of ripeness and thus, late pickings can become possible every year. It is of interest that the experimental samples treated with tannin kept their more or less dark green leaves until 3 weeks after the change of color on the other leaves, in the fall.

From the yield standpoint, in the following year the same samples exhibited an increase of 50%. This favorable influence of tannin on the yield of grapes is due to the fact that the number of grapes was increased and the formation and condition of the grapes improved. This highly significant increase in yield may also be additionally attributed to the effectiveness of the tannin-type compounds against infections occurring in the stems of grapes.

Example II

In addition to healing wounds and combatting infections, occurring in stems, these tannin-type compounds are also effective in combatting viruses, as tannin attacks a virus by rendering it insoluble (a mechanism similar to the tanning of leather).

Particular success has been met in combatting the fan leaf virus, which virus heretofore has been unaffected by chemical agents. On two samples of Riesling on wire frame, 90% being attacked by fan leaf, was sprayed a 1.5% tannin extract. In the following year, when the spraying was repeated twice, only in isolated places could traces of the disease be found. There was concomitantly a 120% increase in yield, as compared to the preceding year.

In addition to fan leaf, specific examples of other virus diseases, that can also be effectively treated by tannin-type compounds are the Yellow vein, Yellow mosaic White Emperor and Pierce viruses.

*Example III*

This example shows the value of this invention in connection with the stone-fruit-producing industry.

On a sandy parcel heavily infected with *Bacterium tumefaciens* were planted 500 one-year old peach trees which had been pretreated with tannin. The roots of these trees had been immersed into a 3% tannin solution for one minute and were then planted. During the summer, the soil was treated once with a 1.5% tannin solution in an amount of 1 liter per square meter. In the fall, all of the trees were dug out and found to be healthy. The examination of 100 untreated control trees of the same species has shown that the same had serious or small, but characteristic swellings on their roots.

Therefore, whereas all previously known chemical preparations have been found to be either completely worthless or of very little value in the treatment of *Bacterium tumefaciens*, tannin-type compounds have proved to be a panacea.

It has thus been found that tannin in preferred aqueous concentrations of 1.5%–3% is effective against diseases caused by bacteria. The effect of these tannins is based upon their preventing the penetration of such bacteria, their activity being due to the extracellular cellulases in order to open the way for such organisms.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention and within the scope as set forth in the hereinabove-stated specification.

It will be understood that the invention is susceptible to modification in order to adapt it to different usages and conditions, and, accordingly, it is desired to comprehend such modifications within the invention as may fall within the scope of the appended claims.

What I claim:

1. A process for protecting grapes from *Botrytis cinerea* of vines and fan leaf virus which process comprises spraying growing grapes susceptible to said diseases with an aqueous solution of a tannin-type compound selected from the group consisting of tannin, tannin extract, pyrogallol and catechol, thereby healing any fissures in said grapes, thus preventing spore intrusion into the grapes, and also killing said virus, whereby the grapes can be left to ripen on the vines resulting in a high yield of grapes having a high sugar content.

2. The process of claim 1, wherein the solution further comprises a fungicide, whereby any fungi present are destroyed by the fungicide.

3. The process of claim 1, wherein the concentration of the tannin-type compound in the aqueous solution is about 1.5% by weight.

4. A process for protecting stone-fruit-trees from *Bacterium tumefaciens*, which process comprises treating the roots of stone-fruit-trees susceptible to said disease with an aqueous solution of a tannin-type compound selected from the group consisting of tannin, tannin extract, pyrogallol and catechol.

5. The process of claim 4, wherein the concentration of the tannin-type compound in the aqueous solution is about 1.5–3.0% by weight.

6. A process for protecting peach trees from soil infected with *Bacterium tumefaciens*, which process comprises immersing the roots of peach trees in a 3% solution of a tannin-type compound from the group consisting of tannin, tannin extracts, pyrogallol and catechol for about one minute, planting said peach trees in said soil and during the summer treating the soil with a 1.5% aqueous solution of said tannin-type compound in an amount of about 1 liter of solution per square meter, thereby resulting in an effective control of *Bacterium tumefaciens*.

References Cited in the file of this patent

UNITED STATES PATENTS

| | | |
|---|---|---|
| 167,094 | Donn | Oct. 26, 1874 |
| 1,183,055 | Wemer | May 16, 1916 |
| 1,890,019 | Ritchie | Dec. 6, 1932 |
| 2,124,235 | Cunradi | July 19, 1938 |
| 2,180,081 | Cunradi | Nov. 14, 1939 |
| 2,586,274 | Tollenaar | Feb. 19, 1952 |
| 2,662,893 | Kurth | Dec. 15, 1953 |
| 2,799,612 | Santmyer | July 16, 1957 |

FOREIGN PATENTS

| | | |
|---|---|---|
| 299,025 | Italy | Oct. 18, 1930 |
| 180,764 | Austria | Jan. 10, 1955 |

OTHER REFERENCES

Rose: The Condensed Chemical Dictionary, 5th Ed., 1956, pp. 921, 1062.

Jenkins: The Chemistry of Organic Medicinal Products, 1957, pages 175, 176.

U.S. Dispensatory, 25th Ed. (1955), pages 1379–1381.

Frear: A Catalogue of Insecticides and Fungicides, vol. I, page 183; vol. II, page 59 (1948).

King: U.S. Dept. Agr. Handbook No. 69, May 1954, pp. 112, 321.

Farmers Bulletin No. 1896, U.S. Dept. Agr., February 1950, pp. 16–19.

Hanna: The Handbook of Agr. Chemistry, 2nd Ed., 1958, page 169.